United States Patent
Woycik et al.

(10) Patent No.: US 9,834,246 B1
(45) Date of Patent: Dec. 5, 2017

(54) STEERING COLUMN ASSEMBLY HAVING AN ENERGY ABSORPTION STRAP ASSEMBLY

(71) Applicant: STEERING SOLUTIONS IP HOLDING CORPORATION, Saginaw, MI (US)

(72) Inventors: Richard E. Woycik, Saginaw, MI (US); Kirk D. Potts, Fenton, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/234,052

(22) Filed: Aug. 11, 2016

(51) Int. Cl.
*B62D 1/19* (2006.01)
*F16F 7/12* (2006.01)

(52) U.S. Cl.
CPC ............... *B62D 1/192* (2013.01); *F16F 7/12* (2013.01)

(58) Field of Classification Search
CPC ... B62D 1/192; F16F 7/12; F16F 7/123; F16F 7/128
See application file for complete search history.

(56) References Cited

U.S. PATENT DOCUMENTS

| | | | |
|---|---|---|---|
| 9,669,862 B1* | 6/2017 | Dubay | B62D 1/195 |
| 2004/0217581 A1* | 11/2004 | Dubay | B62D 1/195 280/777 |
| 2007/0194563 A1* | 8/2007 | Menjak | B62D 1/195 280/777 |
| 2007/0228716 A1* | 10/2007 | Menjak | B62D 1/192 280/777 |
| 2009/0033082 A1* | 2/2009 | Klukowski | B62D 1/195 280/777 |
| 2015/0128752 A1* | 5/2015 | Buzzard | F16F 7/128 74/493 |
| 2016/0244015 A1* | 8/2016 | Dubay | B60R 21/02 |
| 2016/0368524 A1* | 12/2016 | Tinnin | B62D 1/192 |
| 2017/0050665 A1* | 2/2017 | Appleyard | B62D 1/192 |

* cited by examiner

*Primary Examiner* — Drew J Brown
(74) *Attorney, Agent, or Firm* — Cantor Colburn LLP

(57) ABSTRACT

A steering column assembly includes a jacket assembly and an energy absorption strap assembly. The energy absorption strap assembly has a first energy absorption strap and a second energy absorption strap. The first energy absorption strap has a first strap body that extends between a first strap first end and a first strap second end. The first strap body defines a first opening and a second opening. The second energy absorption strap has a second strap body that extends between a second strap first end and a second strap second end. The second strap first end is at least partially received within the first opening and the second strap second end is at least partially received within the second opening.

19 Claims, 3 Drawing Sheets

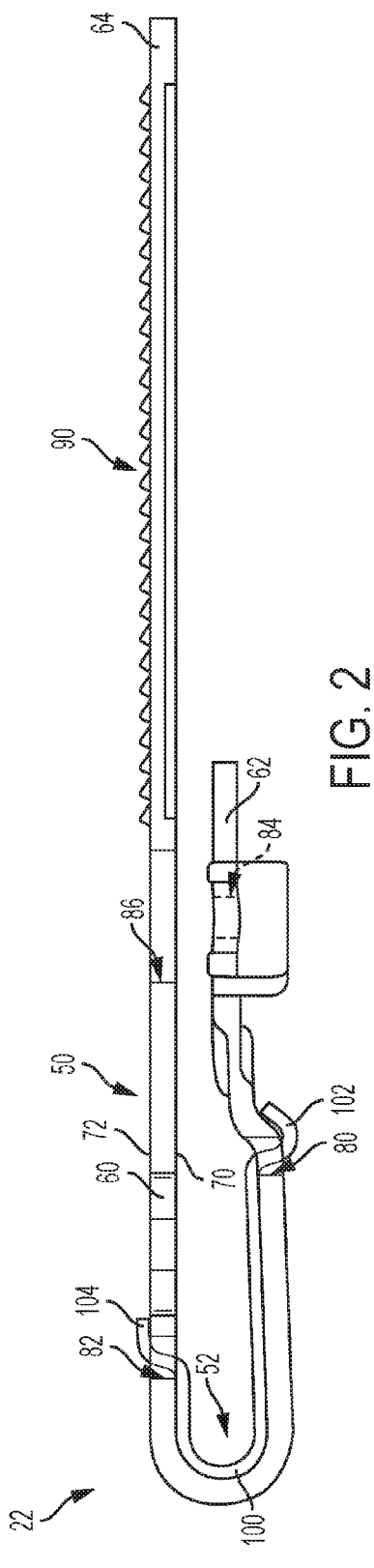
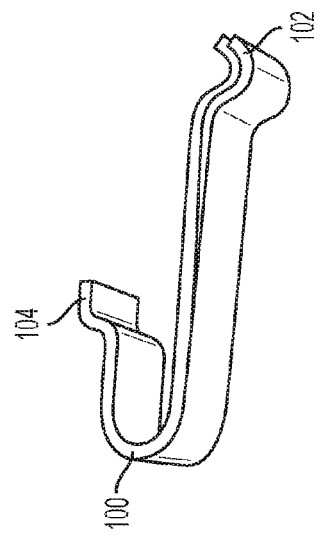
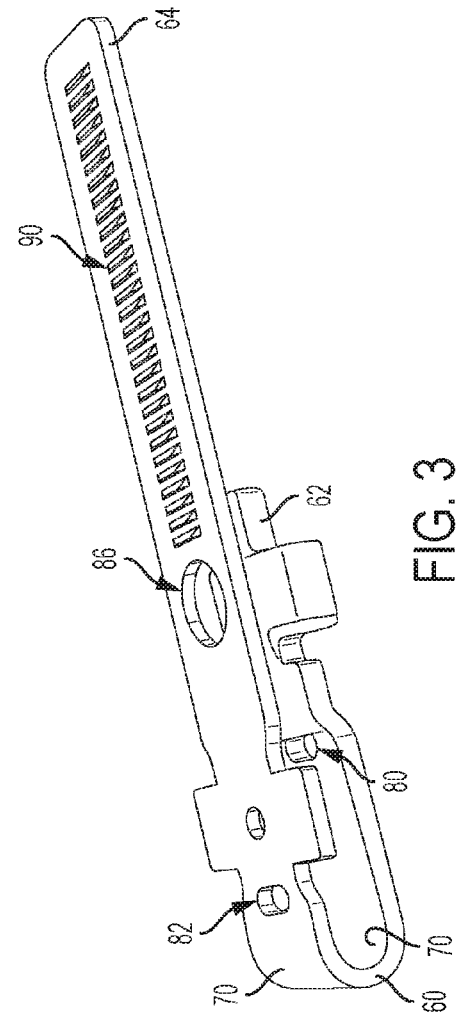

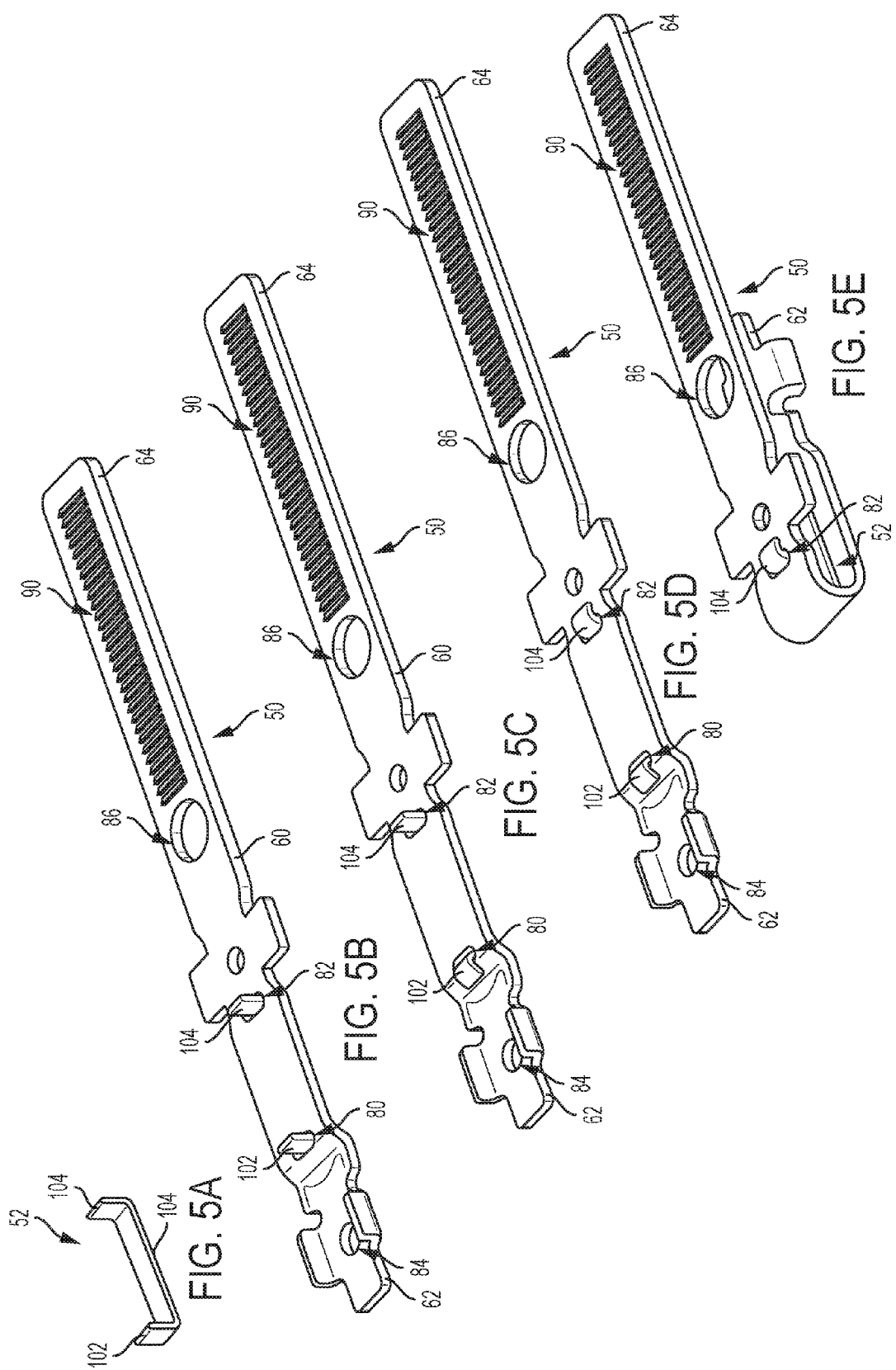

STEERING COLUMN ASSEMBLY HAVING AN ENERGY ABSORPTION STRAP ASSEMBLY

BACKGROUND OF THE INVENTION

Some steering column assemblies are collapsible along a longitudinal axis. The collapsing of the steering column assembly along the longitudinal axis is energy absorbing and may be beneficial during a vehicle impact event. Roll strap devices are used to absorb kinetic energy during a vehicle impact event in which the steering column may collapse.

Accordingly, it is desirable to provide a system capable of varying the collapse load of the steering column to provide variable kinetic energy dissipation during a steering column collapse event.

SUMMARY OF THE INVENTION

According to an embodiment of the present disclosure, a steering column assembly is provided. The steering column assembly includes a jacket assembly and an energy absorption strap assembly. The energy absorption strap assembly is coupled to the jacket assembly. The energy absorption strap assembly has a first energy absorption strap and a second energy absorption strap. The first energy absorption strap has a first strap body that extends between a first strap first end and a first strap second end. The first strap body defines a first opening and a second opening. The second energy absorption strap has a second strap body that extends between a second strap first end and a second strap second end. The second strap first end is at least partially received within the first opening and the second strap second end is at least partially received within the second opening.

According to another embodiment of the present disclosure, an energy absorption strap assembly is provided. The energy absorption strap assembly includes a first energy absorption strap and a second energy absorption strap. The first energy absorption strap has a first strap body that extends between a first strap first end and a first strap second end. The first strap first end is operatively connected to a jacket assembly. The first strap body defines a first opening and a second opening. The second energy absorption strap has a second strap body that extends between a second strap first end and a second strap second end. The second strap first end is configured to be at least partially received within the first opening and the second strap second end is configured to be at least partially received within the second opening.

According to yet another embodiment of the present disclosure, a method of manufacturing an energy absorption strap assembly is provided. The method includes providing a first energy absorption strap. The first energy absorption strap has a first strap body that extends between a first strap first end and a first strap second end. The first strap body defines a first opening and a second opening each extend from an interior surface to an exterior surface of the first strap body. The method further includes providing a second energy absorption strap that has a second strap body that extends between a second strap first end and a second strap second end. The method still further includes inserting the second strap first end into the first opening and the second strap second end into the second opening.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a side view of the energy absorption strap assembly of the steering column assembly of FIG. 1;

FIG. 3 is a perspective view of a first energy absorption strap of the energy absorption strap assembly;

FIG. 4 is a perspective view of a second energy absorption strap of the energy absorption strap assembly; and FIGS. 5A-5E are illustrative views of a method of making an energy absorption strap assembly.

DETAILED DESCRIPTION

Figure 1:
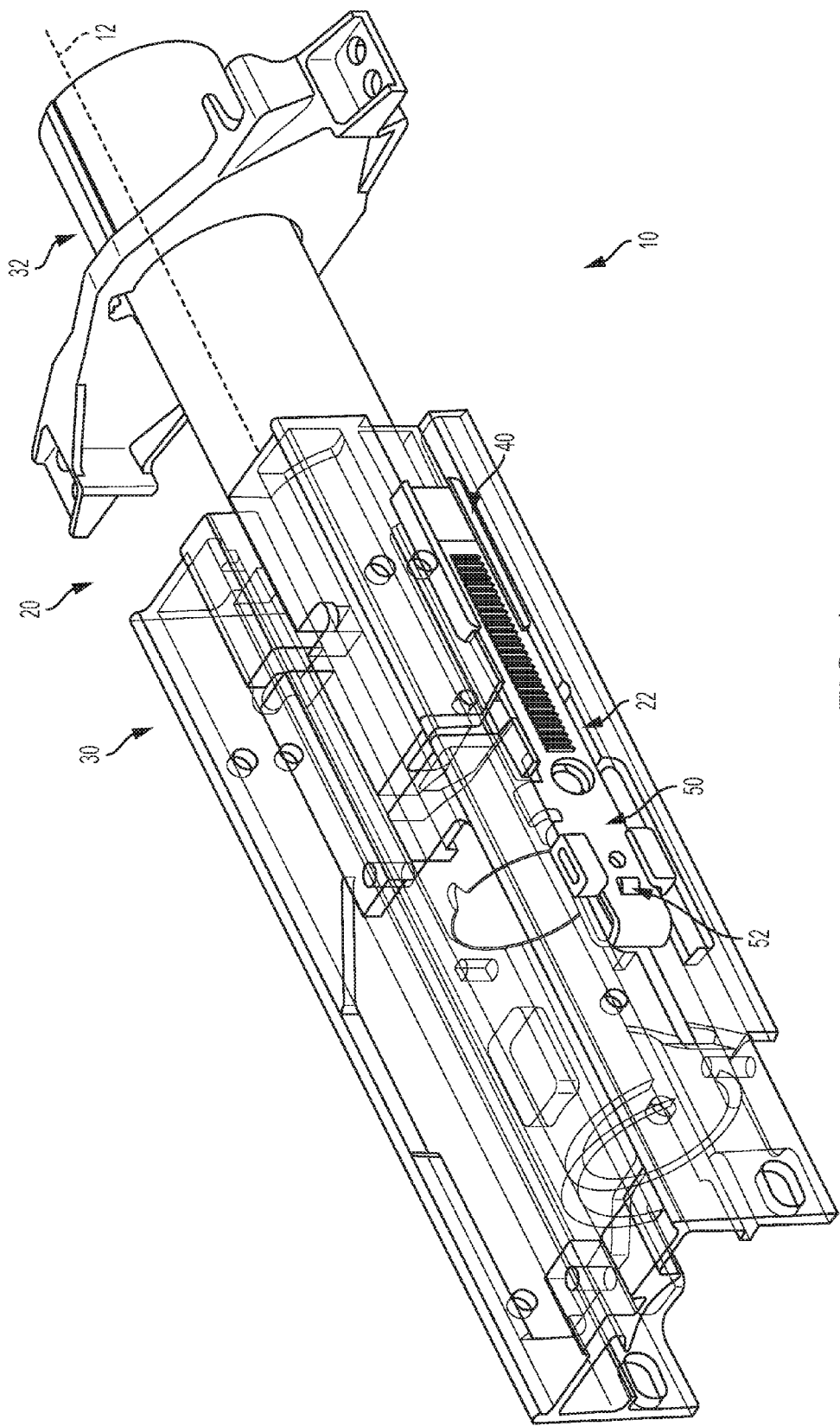
FIG. 1 is a perspective view of a steering column assembly having an energy absorption strap assembly.

Referring now to the Figures, where the invention will be described with reference to specific embodiments, without limiting same, it is to be understood that the disclosed embodiments are merely illustrative of the present disclosure and may be embodied in various and alternative forms. Features or elements of the disclosed embodiments may be combined or removed to form further embodiments. The figures are not necessarily to scale; some features may be exaggerated or minimized to show details of particular components. Therefore specific structural and functional details disclosed herein are not to be interpreted as limiting, but merely as a representative basis for teaching one skilled in the art to variously employ the present disclosure.

Referring to FIG. 1, a steering column assembly 10 is shown. The steering column assembly 10 extends along a steering column axis 12. The steering column assembly 10 may be linearly extendable, retractable, and collapsible along the steering column axis 12. The steering column assembly 10 may collapse along the steering column axis 12 in response to a steering column collapse event.

The steering column assembly 10 includes a jacket assembly 20 and an energy absorption strap assembly 22. The jacket assembly 20 includes a lower jacket assembly 30 and an upper jacket assembly 32.

The lower jacket assembly 30 extends along the steering column axis 12. The lower jacket assembly 30 is operatively connected to a vehicle structure by a mounting bracket. In at least one embodiment, the lower jacket assembly 30 includes a guide bracket 40. The guide bracket 40 is disposed on the lower jacket assembly 30.

The upper jacket assembly 32 extends along the steering column axis 12 and is at least partially received within the lower jacket assembly 20. In at least one embodiment, the combination of the lower jacket assembly 30 and the upper jacket assembly 32 are capable of pivot or rake adjustment about a pivot point directly by the driver or thru a pivot adjust actuator assembly. The pivot point may be defined by the mounting bracket or by the lower jacket assembly 30.

In at least one embodiment, the upper jacket assembly 32 is extendable or retractable along the steering column axis 12 directly by the driver or thru a telescope actuator assembly. The upper jacket assembly 32 is capable of retracting within the lower jacket assembly 20 in response to a steering column collapse event.

The energy absorption strap assembly 22 is operatively coupled to the jacket assembly 20. The energy absorption strap assembly 22 extends between and is operatively coupled to the lower jacket assembly 30 and the upper jacket assembly 32. The energy absorption strap assembly 22 is configured to provide a drag load or force opposing translation of the upper jacket assembly 32 relative to the lower jacket assembly 30 during a steering column collapse event. The drag load or force opposing translation may be adaptive or variable based on the configuration of the energy absorption strap assembly 22. The energy absorption strap assembly 22 includes a first energy absorption strap 50 and a second energy absorption strap 52.

Referring to FIGS. 2 and 3, the first energy absorption strap 50 is configured as a low load energy absorption strap. The first energy absorption strap 50 is configured as a push style strap that is configured to provide a drag load or force opposing translation of the upper jacket assembly 32 relative to the lower jacket assembly 30 during a steering column collapse event less than a threshold. The first energy absorption strap 50 is made of a first material. The first material may be metallic, thermoplastic, rubber, or the like.

The first energy absorption strap 50 has a first energy absorption strap width. The first energy absorption strap width is measured between opposing sides of the first energy absorption strap 50.

The first energy absorption strap 50 has a first strap body 60 that extends between a first strap first end 62 and a first strap second end 64. The first strap first end 62 is operatively connected to the upper jacket assembly 32. The first strap second end 64 is operatively connected to the lower jacket assembly 30. The first strap second end 64 is slidably received within the guide bracket 40.

The first strap body 60 has an interior surface 70 disposed opposite an exterior surface 72. The interior surface 70 and the exterior surface 72 extend between the first strap first end 62 and the first strap second end 64.

The first strap body 60 defines a first opening 80, a second opening 82, a first mounting opening 84, and a second mounting opening 86. The first opening 80 is disposed proximate the first strap first end 62. The first opening 80 extends from the interior surface 70 towards the exterior surface 72. The first opening 80 is configured as a generally elongate slot having a pair of opposing flat side surfaces joined by a pair of opposing arcuate surfaces.

The second opening 82 is disposed between the first strap first end 62 and the first strap second end 64. The second opening 82 extends from the interior surface 70 towards the exterior surface 72. The second opening 82 is configured as a generally elongate slot having a pair of opposing flat side surfaces joined by a pair of opposing arcuate surfaces.

The first mounting opening 84 is disposed proximate the first strap first end 62. The first mounting opening 84 is disposed between the first strap first end 62 and. The first opening 80.

The second mounting opening 86 is disposed proximate the first strap second end 64. The second mounting opening 86 is disposed between the first strap second end 64 and the second opening 82.

The first strap body 60 includes a plurality of engagement members 90. The plurality of engagement members 90 are disposed between the second mounting opening 86 and the first strap second end 64. The plurality of engagement members 90 are configured as protrusions, ridges, teeth, tabs, or the like that extend from the exterior surface 72 of the first strap body 60 away from the jacket assembly 20.

Referring to FIGS. 2 and 4, the second energy absorption strap 52 is configured as a high load energy absorption strap. The second energy absorption strap 52 is configured to adjust a drag load or force opposing translation of the upper jacket assembly 32 relative to the lower jacket assembly 30 during a steering column collapse event to be greater than the drag load or force opposing translation provided by the first energy absorption strap 50 alone. The second energy absorption strap 52 is made of a second material. The second material may be different from the first material. The second material may be metallic, thermoplastic, rubber, or the like.

The second energy absorption strap 52 has a second energy absorption strap width. The second energy absorption strap width is measured between opposing sides of the second energy absorption strap 52. The second energy absorption strap width is less than the first energy absorption strap width.

The second energy absorption strap 52 is at least partially received within the first energy absorption strap 50 such that the first energy absorption strap 50 is disposed about the second energy absorption strap 52. In at least one embodiment, the second energy absorption strap 52 is nested within the first energy absorption strap 50. The second energy absorption strap 52 is configured to engage the interior surface 70 of the first strap body 60 of the first energy absorption strap 50.

The second energy absorption strap 52 has a second strap body 100 that extends between a second strap first end 102 and a second strap second end 104. The second strap first end 102 and the second strap second end 104 are each operatively connected to the first energy absorption strap 50.

The second strap first end 102 extends from the second strap body 100. The second strap first end 102 is disposed in a non-coplanar relationship with the second strap body 100. In at least one embodiment, the second strap first end 102 is provided with an arcuate shape.

The second strap first end 102 is at least partially received within the first opening 80 of the first strap body 60 of the first energy absorption strap 50. The second strap first end 102 extends towards the first strap first end 62. The second strap first end 102 is configured as a tab. The tab is configured to engage the exterior surface 72 of the first strap body 60 of the first energy absorption strap 50. In at least one embodiment, the second strap first end 102 may be secured to the first strap body 60 of the first energy absorption strap 50 by a fastener such as a staple, a pin, or the like.

The second strap second end 104 extends from the second strap body 100. The second strap second end 104 is disposed in a non-coplanar relationship with the second strap body 100. In at least one embodiment, the second strap second end 104 is provided with an arcuate shape.

The second strap second end 104 is at least partially received within the second opening 82 of the first strap body 60 of the first energy absorption strap 50. The second strap second end 104 extends towards the first strap second end 64. The second strap second end 104 is configured as a tab. The tab is configured to engage the exterior surface 72 of the first strap body 60 of the first energy absorption strap 50. In at least one embodiment, the second strap second end 104 may be secured to the first strap body 60 of the first energy absorption strap 50 by a fastener such as a staple, a pin, or the like.

Referring to FIGS. 5A-5E, a method of manufacturing an energy absorption strap assembly is illustrated. Referring to FIG. 5A the second energy absorption strap 52 is provided. The second energy absorption strap 52 includes the second strap body 100 and the second strap first end 102 and the second strap second end 104 are each disposed substantially perpendicular to the second strap body 100. In this condition, each of the second strap first end 102 and the second strap second end 104 are not provided with an arcuate shape.

The first energy absorption strap 50 is also provided. The first energy absorption strap 50 is provided in an unrolled condition or is provided in platform. Referring to FIG. 5B, the second strap first end 102 is inserted into the first opening 80 of the first energy absorption strap 50. The second strap second end 104 is inserted into the second opening 82 of the first energy absorption strap 50. The second strap body 100 engages the interior surface 70 of the first energy absorption strap 50.

Referring to FIG. 5C, the second strap first end 102 is bent towards the exterior surface 72 of the first energy absorption strap 50. The second strap first end 102 is bent towards the first strap first end 62 of the first energy absorption strap 50.

Referring to FIG. 5D, the second strap second end 104 is bent towards the exterior surface 72 of the first energy absorption strap 50. The second strap second end 104 is bent towards the first strap second end 64 of the first energy absorption strap 50.

At least one of the second strap first end 102 and the second strap second end 104 may be secured to the first strap body 60 of the first energy absorption strap 50. The second strap first end 102 and the second strap second end 104 may be secured by further bending at least one of the second strap first end 102 and the second strap second end 104. The second strap first end 102 and the second strap second end 104 may be secured to the first energy absorption strap 50 by the application of a fastener, an adhesive, or the like.

Referring to FIG. 5E, the first strap first end 62 is folded towards the first strap second end 64 to nest the second energy absorption strap 52 within the first energy absorption strap 50. In at least one embodiment, the first strap second end 64 is folded towards the first strap first end 62. The first strap first end 62 and the first rep second and 64 may be folded relative to each other such that the first strap first end 62 and the first strap second end 64 are disposed substantially parallel to each other and the second strap first end 102 and the second strap second end 104 are disposed substantially parallel to each other.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments or combinations of the described embodiments. Accordingly, the invention is not to be seen as limited by the foregoing description.

Having thus described the invention, it is claimed:
1. A steering column assembly, comprising:
 a jacket assembly; and
 an energy absorption strap assembly coupled to the jacket assembly, the energy absorption strap assembly, comprising:
  a first energy absorption strap having a first strap body extending between a first strap first end and a first strap second end, the first strap body defining a first opening and a second opening; and
  a second energy absorption strap having a second strap body extending between a second strap first end and a second strap second end, the second strap first end at least partially received within the first opening and the second strap second end at least partially received within the second opening.

2. The steering column assembly of claim 1, wherein the first energy absorption strap is made of a first material.

3. The steering column assembly of claim 2, wherein the second energy absorption strap is made of a second material.

4. The steering column assembly of claim 3, wherein the first material is different from the second material.

5. The steering column assembly of claim 1, wherein the first energy absorption strap is disposed about the second energy absorption strap.

6. The steering column assembly of claim 1, wherein the second strap first end is configured as a tab that engages the first strap body.

7. The steering column assembly of claim 1, wherein the second strap second end is configured as a tab that engages the first strap body.

8. An energy absorption strap assembly, comprising:
 a first energy absorption strap having a first strap body extending between a first strap first end and a first strap second end, the first strap first end operatively connected to a jacket assembly, the first strap body defining a first opening and a second opening; and
 a second energy absorption strap having a second strap body extending between a second strap first end and a second strap second end, the second strap first end is configured to be at least partially received within the first opening and the second strap second end is configured to be at least partially received within the second opening.

9. The energy absorption strap assembly of claim 8, wherein the first strap body defines a first mounting opening disposed between the first strap first end and the first opening.

10. The energy absorption strap assembly of claim 8, wherein the first strap body defines a second mounting opening disposed between the first strap second end and the second opening.

11. The energy absorption strap assembly of claim 8, wherein the first strap body includes an interior surface disposed opposite an exterior surface.

12. The energy absorption strap assembly of claim 11, wherein the second strap body engages the interior surface of the first strap body.

13. The energy absorption strap assembly of claim 12, wherein the second strap first end is configured to engage the exterior surface of the first strap body.

14. The energy absorption strap assembly of claim 13, wherein the second strap second end is configured to engage the exterior surface of the first strap body.

15. A method of manufacturing an energy absorption strap assembly, comprising:
 providing a first energy absorption strap having a first strap body that extends between a first strap first end and a first strap second end, the first strap body defines a first opening and a second opening each extends from an interior surface to an exterior surface of the first strap body;

providing a second energy absorption strap having a second strap body that extends between a second strap first end and a second strap second end; and inserting the second strap first end into the first opening and the second strap second end into the second opening.

16. The method of claim 15, further comprising:

bending the second strap first end towards the exterior surface of the first strap body; and bending the second strap second end towards the exterior surface of the first strap body.

17. The method of claim 16, further comprising:

securing at least one of the second strap first end and the second strap second end to the strap body.

18. The method of claim 17, further comprising:

folding the first strap first end towards the first strap second end.

19. The method of claim 18, wherein the first strap first end is disposed parallel to the first strap second end.

\* \* \* \* \*